United States Patent
Ikuta

(10) Patent No.: US 10,520,156 B2
(45) Date of Patent: Dec. 31, 2019

(54) VEHICLE LIGHT

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventor: Keisuke Ikuta, Kariya (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/299,920

(22) Filed: Mar. 12, 2019

(65) Prior Publication Data

US 2019/0285241 A1   Sep. 19, 2019

(30) Foreign Application Priority Data

Mar. 16, 2018   (JP) .................. 2018-050013

(51) Int. Cl.
  *F21S 41/24*   (2018.01)
  *F21S 41/30*   (2018.01)
  *F21S 43/239*   (2018.01)
  *F21S 43/237*   (2018.01)

(52) U.S. Cl.
  CPC .............. *F21S 41/24* (2018.01); *F21S 41/30* (2018.01); *F21S 43/237* (2018.01); *F21S 43/239* (2018.01)

(58) Field of Classification Search
  CPC .......... F21S 41/24; F21S 43/237; F21S 41/30; F21S 43/239
  See application file for complete search history.

(56) References Cited

U.S. PATENT DOCUMENTS

| | | | |
|---|---|---|---|
| 2012/0250343 A1* | 10/2012 | Koizumi | F21S 43/14 362/511 |
| 2017/0108191 A1* | 4/2017 | Nishihata | B60Q 1/0052 |
| 2018/0160095 A1* | 6/2018 | Lee | B60Q 1/0058 |

FOREIGN PATENT DOCUMENTS

JP   2011-018563 A   1/2011

* cited by examiner

*Primary Examiner* — Kevin Quarterman
(74) *Attorney, Agent, or Firm* — Sughrue Mion, PLLC

(57) ABSTRACT

A vehicle light includes a light compartment, a first light emission unit, and a second light emission unit. The first light emission unit is arranged in the light compartment and includes a first light emission body and a light guide body configured to emit light by internally reflecting light from the first light emission body. The second light emission unit is arranged in the light compartment and includes a second light emission body and a reflector configured to reflect light from the second light emission body in a vehicle forward direction. The light guide body is arranged outward with respect to a vehicle widthwise direction in the light compartment, and a light emission portion of the light guide body at least partially overlaps a path of light reflected by the reflector.

3 Claims, 2 Drawing Sheets

VEHICLE LIGHT

BACKGROUND

1. Field

The following description relates to a vehicle light.

2. Description of Related Art

A vehicle such as an automobile includes a vehicle light such as a headlight. For example, Japanese Laid-Open Patent Publication No. 2011-18563 describes a vehicle light that includes multiple light emission units in a light compartment. The light emission units include a main light emission unit and a secondary light emission unit. The main light emission unit includes a main light emission element and a reflector, and the secondary light emission unit includes a secondary light emission element and a light guide body.

The vehicle light may be used in daytime in addition to nighttime so that the presence of the vehicle can be recognized. Accordingly, there is a need to improve the light distribution performance of the vehicle light.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle light includes a light compartment, a first light emission unit, and a second light emission unit. The first light emission unit is arranged in the light compartment and includes a first light emission body and a light guide body configured to emit light by internally reflecting light from the first light emission body. The second light emission unit is arranged in the light compartment and includes a second light emission body and a reflector configured to reflect light from the second light emission body in a vehicle forward direction. The light guide body is arranged outward with respect to a vehicle widthwise direction in the light compartment, and a light emission portion of the light guide body at least partially overlaps a path of light reflected by the reflector.

It is an object of the following description to provide a vehicle light that improves the light distribution performance.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

One embodiment of a vehicle light will now be described with reference to FIGS. 1 to 4. In the description hereafter, the frame of reference for a vehicle forward direction, a vehicle widthwise direction, and a vehicle height direction will be a state in which the vehicle lights are mounted on the vehicle.

Figure 1:
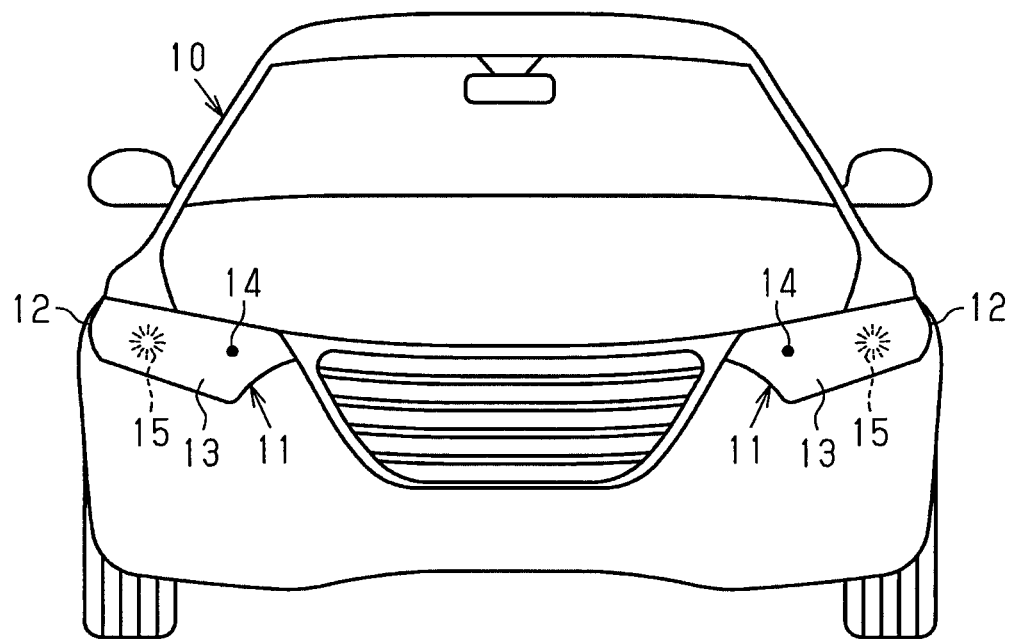
FIG. 1 is a front view of a vehicle including two vehicle lights.

As shown in FIG. 1, the front of a vehicle 10 includes two vehicle lights 11 serving as headlights. The vehicle lights 11 are symmetrically arranged at left and right sides of the vehicle 10. The vehicle lights 11 are configured similarly. The vehicle light 11 located at the right side of the vehicle 10 (left side in FIG. 1) will be described below.

The vehicle light 11 includes a housing 12 and an outer lens 13 that is a transparent cover coupled to an open front end of the housing 12. The housing 12 and the outer lens 13 form a light compartment 14. The light compartment 14 accommodates a first light emission device 15 and a second light emission device 16. The first light emission device 15 is configured to be a headlight configured to provide low and high beams. The first light emission device 15 radially emits light outward from the light compartment 14.

Figure 2:
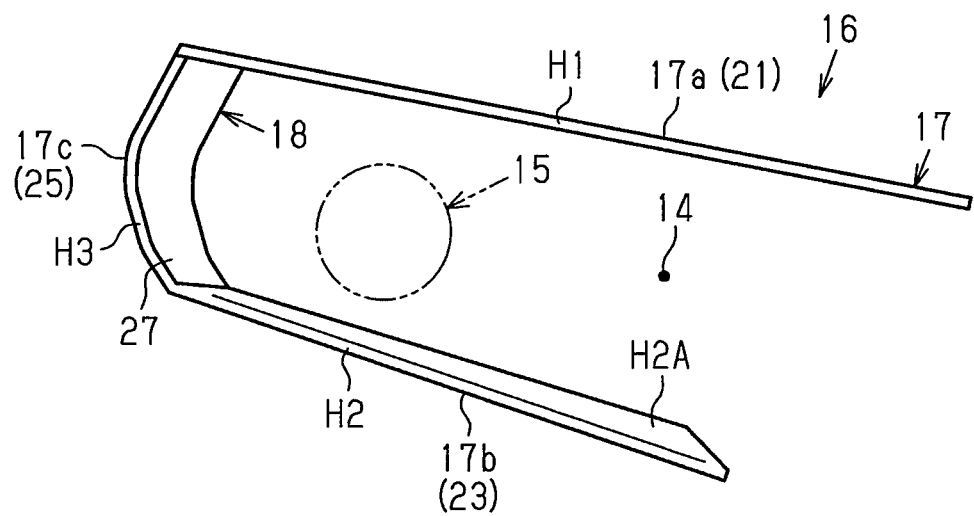
FIG. 2 is a front view of a first light emission device and a second light emission device included in one of the vehicle lights shown in FIG. 1.
Figure 3:
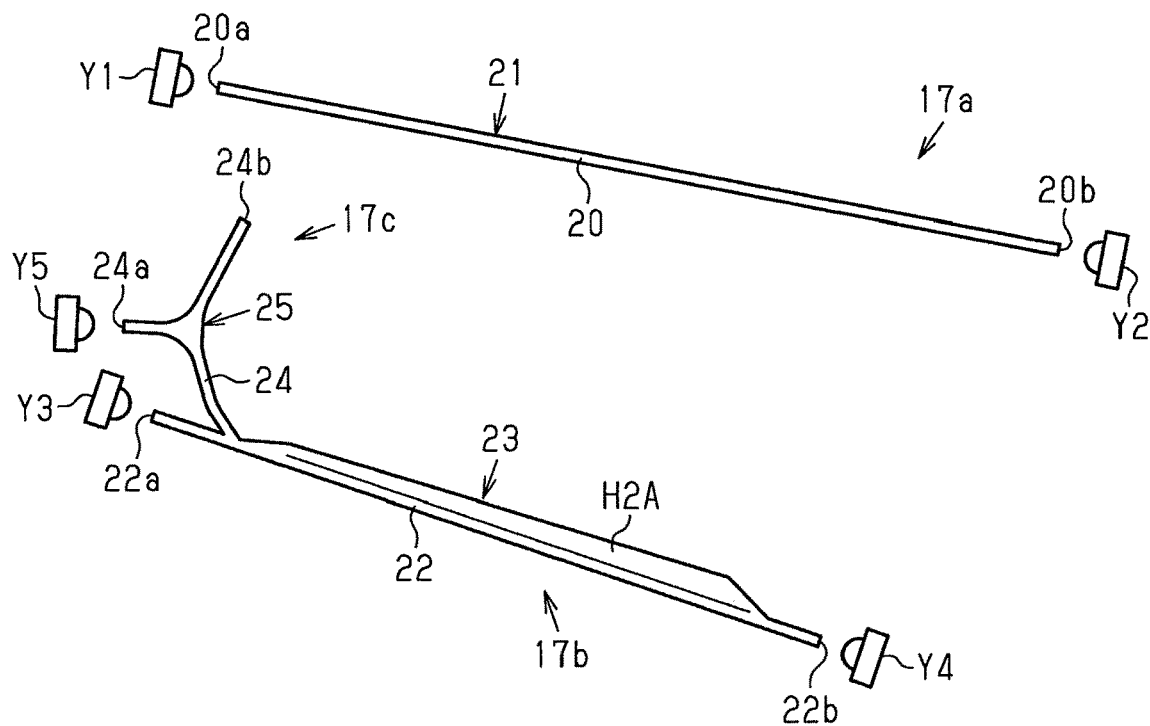
FIG. 3 is a schematic diagram showing the structure of a first light emission unit in the second light emission device shown in FIG. 2.

As shown in FIGS. 2 and 3, the second light emission device 16 includes a plurality of first light emission units 17 (17a, 17b, and 17c) and a second light emission unit 18. Each of the first light emission units 17 includes a light guide body that emits light by internally reflecting the light from a light emission body. The second light emission unit 18 emits light by reflecting the light from the light emission body with a reflector.

The first light emission units 17 in the present embodiment include an upper light emission unit 17a located at an upper part of the housing 12, a lower light emission unit 17b located at a lower part of the housing 12, and a side light emission unit 17c located at a sideward part of the housing 12. The upper light emission unit 17a and the lower light emission unit 17b sandwich the upper and lower sides of the first light emission device 15 in a front view of the vehicle light 11. The side light emission unit 17c is arranged between the upper light emission unit 17a and the lower light emission unit 17b at the right side of the vehicle 10 (left side in FIG. 3).

The upper light emission unit 17a is a linear light emission unit that includes an upper light emission surface H1 extending in the vehicle widthwise direction. The lower light emission unit 17b is a linear light emission unit that includes a lower light emission surface H2 extending in the vehicle widthwise direction. The lower light emission surface H2 of the lower light emission unit 17b includes a widened part H2A projecting in a direction that intersects with the vehicle widthwise direction, in which the lower light emission unit 17b extends. Accordingly, the lower light emission surface H2 of the lower light emission unit 17b emits light over a wider range in the direction intersecting the vehicle widthwise direction than the upper light emission surface H1 of the upper light emission unit 17a. The side light emission unit 17c is a linear light emission unit that includes a side light emission surface H3 extending in the vehicle height direction.

As shown in FIG. 3, the upper light emission unit 17a includes a first light guide body 21 that includes a rod-shaped first main body 20. The upper light emission unit 17a further includes light sources Y1 and Y2. The first main body 20 of the first light guide body 21 is formed to be substantially straight. Further, the first main body 20 of the first light guide body 21 includes a first end 20a and a second end 20b. The lower light emission unit 17b includes a second light guide body 23 that includes a rod-shaped second main body 22 and the plate-like widened part H2A projecting from an intermediate part of the second main body 22. The lower light emission unit 17b further includes light sources Y3 and Y4. The second main body 22 of the second light guide body 23 has a substantially straight shape. The second main body 22 and the widened part H2A are formed integrally. Further, the second main body 22 of the second light guide body 23 includes a first end 22a and a second end 22b.

As shown in FIG. 3, the side light emission unit 17c includes a third light guide body 25 that includes a rod-shaped third main body 24. The side light emission unit 17c further includes a light source Y5. The third main body 24 of the side light emission unit 17c includes a first end 24a. The third main body 24 further includes a first branched portion and a second branched portion that are branched off from the first end 24a in two directions. The branching point is located at the middle of the third main body 24. The first branched portion is connected to an intermediate part of the second light guide body 23, specifically, a part between the first end 22a and the widened part H2A, and integrated with the second light guide body 23. That is, in the present embodiment, the second light guide body 23 that forms the lower light emission unit 17b is integrated with the third light guide body 25 that forms the side light emission unit 17c. Further, the second branched portion includes a second end 24b.

The first light guide body 21, the second light guide body 23, and the third light guide body 25 described above are arranged in the housing 12 of the vehicle light 11, and respectively form the upper light emission unit 17a, the lower light emission unit 17b, and the side light emission unit 17c. Further, the first light guide body 21, the second light guide body 23, and the third light guide body 25 may be formed from a resin, for example, an acrylic resin.

The light sources Y1 to Y5 are light emission bodies that emit light toward the first light guide body 21, the second light guide body 23, and the third light guide body 25. The light sources Y1 to Y5 are arranged in the housing 12 of the vehicle light 11. Each of the light sources in the present embodiment is configured by a base plate, on which a light emitting diode (LED) is mounted. The base plate of each light source may include one or more LEDs.

The housing 12 of the vehicle light 11 includes the first light source Y1 that emits incident light toward the first end 20a of the first light guide body 21 and the second light source Y2 that emits incident light toward the second end 20b of the first light guide body 21. Further, the housing 12 of the vehicle light 11 includes the third light source Y3 that emits incident light toward the first end 22a of the second light guide body 23 and the fourth light source Y4 that emits incident light toward the second end 22b of the second light guide body 23. The housing 12 of the vehicle light 11 also includes the fifth light source Y5 that emits incident light toward the third light guide body 25.

Figure 4:
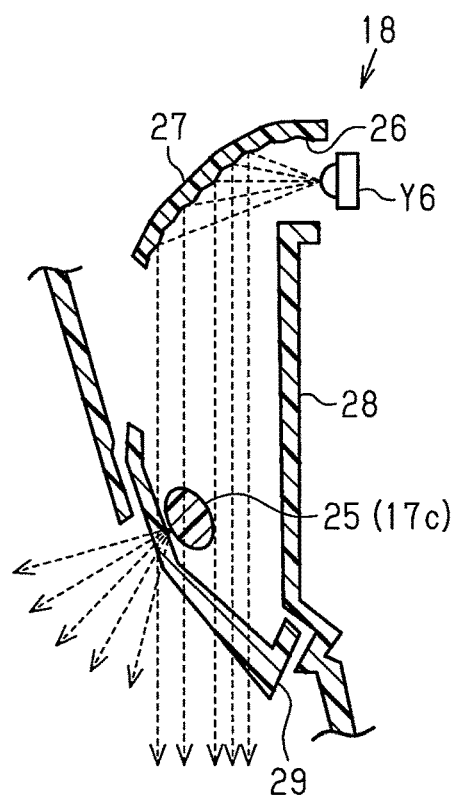
FIG. 4 is a cross-sectional view of a reflector and a side light emission unit included in the second light emission device shown in FIG. 2.

FIG. 4 mainly shows the second light emission unit 18. More specifically, the second light emission unit 18 includes a plurality of sixth light sources Y6 and a reflector 27. The reflector 27 includes a reflection surface 26 that faces the front and reflects the light from the sixth light sources Y6. The sixth light sources Y6 are arranged next to one another in the height direction of the vehicle light 11 and emit light toward the reflection surface 26 of the reflector 27.

FIG. 4 shows a partition wall 28 that partitions the light compartment 14 of the vehicle light 11. More specifically, the partition wall 28 is arranged between the first light emission device 15 and the second light emission device 16. The third light guide body 25 of the side light emission unit 17c is arranged in front of the reflector 27 of the second light emission device 16. In the present embodiment, the third light guide body 25 is arranged to partially overlap the reflection surface 26 of the reflector 27 in the front-rear direction in a front view. The third light guide body 25 is arranged outward with respect to the vehicle widthwise direction in the light compartment 14. That is, in the present embodiment, the third light guide body 25 is arranged close to the side of the vehicle 10. Further, the third light guide body 25 is arranged so that its light emission portion is entirely located in the path of the light reflected by the reflector 27. The entire light emission portion corresponds to the outline of the light guide body in the cross section shown in FIG. 4. Further, an inner lens 29 is arranged in front of the third light guide body 25. The dashed arrows in FIG. 4 indicate the path of the light reflected by the reflector 27 and path of light emitted by the third light guide body 25.

The operation of the vehicle light 11 in the present embodiment will now be described.

When the second light emission device 16 is activated, the first to sixth light sources Y1 to Y6 emit light. As a result, the upper light emission unit 17a internally reflects the light from the first and second light sources Y1 and Y2 with the first light guide body 21 and emits light linearly. That is, the light of the light sources Y1 and Y2 entering the first light guide body 21 is internally reflected by the first light guide body 21 and linearly emitted from the first light guide body 21. The lower light emission unit 17b internally reflects the light from the third and fourth light sources Y3 and Y4 with the second light guide body 23 and emits light linearly. That is, the light of the third and fourth light sources Y3 and Y4 entering the second light guide body 23 is internally reflected by the second light guide body 23 and linearly emitted from the second light guide body 23. Consequently, the vehicle light 11 emits light over a wide range in the vehicle widthwise direction.

In addition to the light of the third and fourth light sources Y3 and Y4, the light of the fifth light source Y5 enters the second light guide body 23 through the third light guide body 25. This increases the amount of light entering the lower light emission unit 17b compared to the first light guide body 21 of the upper light emission unit 17a and increases the light emission intensity of the lower light emission unit 17b. Further, the widened part H2A of the second light guide body 23 emits light so that the lower light emission unit 17b has a wider light emission range than the upper light emission unit 17a.

The light of the sixth light sources Y6 is reflected by the reflection surface 26 of the reflector 27 toward the inner lens 29 and emitted through the inner lens 29 toward the front of the vehicle 10 as diffused light. In addition, the side light emission unit 17c arranged at the side of the vehicle 10 internally reflects the light of the fifth light source Y5 that enters the third light guide body 25 and emits light linearly. That is, the light from the fifth light source Y5 entering the third light guide body 25 is internally reflected by the third light guide body 25 and linearly emitted from the third light guide body 25. Moreover, in this present embodiment, the side light emission unit 17c is arranged to partially overlap the reflection surface 26 of the reflector 27. Accordingly, the vehicle light 11 mixes the light reflected by the reflector 27 and directed toward the front of the vehicle 10 with the light emitted from the side light emission unit 17c toward the side of the vehicle 10. This allows for the emission of light that is entirely seamless from the front to the side of the vehicle 10.

The present embodiment has the advantages described below.

(1) An optical system using the reflector 27 is combined with an optical system using the third light guide body 25. Specifically, the third light guide body 25 is arranged to overlap the reflection surface 26 of the reflector 27. Accordingly, the light reflected by the reflector 27 and the light emitted from the third light guide body 25 allow for recognition of the illumination of the vehicle light 11 from both the front and the side of the vehicle 10. Thus, the vehicle light 11 has relatively high light distribution performance.

(2) The vehicle light 11 of the present embodiment combines the optical system using the reflector 27 with the optical system using the third light guide body 25. Thus, the vehicle light 11 is configured to be a daytime running lamp. In addition, the vehicle light 11 is configured to be a clearance lamp. That is, the vehicle light 11 in the present embodiment is configured to be both a daytime running lamp and a clearance lamp.

(3) A daytime running lamp may be formed by a single optical system using a light guide body or a single optical system using a reflector as long as the necessary amount of light can be emitted. However, a light guide body emits light by internally reflecting light. Accordingly, the optical system using a light guide body has a low light distribution efficiency and requires a light source with a high brightness (such as bright LED) to emit a sufficient amount of light. Further, with the optical system using a reflector, light concentrates at the front of the reflector. Accordingly, many light sources are required to emit light over a wide range. In other words, a daytime running lamp using only one of these optical systems will either increase energy consumption or lower the aesthetic appeal when illuminated. In this regard, the vehicle light 11 of the present embodiment combines the optical system using a light guide body with the optical system using a reflector and effectively uses each optical system so that the vehicle light 11 has a relatively superior light distribution performance.

(4) The third light guide body 25 is arranged in the path of the light reflected by the reflector 27 and located outward with respect to the vehicle widthwise direction in the light compartment 14. Accordingly, the light directed toward the side of the vehicle 10 by the third light guide body 25 is provided in addition to the light reflected by the reflector 27 and directed toward the front. Thus, even when the optical system using the reflector 27 does not include many light emission bodies, light is emitted over a wide range.

(5) The first to third light guide bodies 21, 23, and 25 form the upper light emission unit 17a, the lower light emission unit 17b, and the side light emission unit 17c, respectively. The light of the light emission body enters through the corresponding end of each of the first to third light guide bodies 21, 23, and 25. This allows for a wide range light emission with fewer light emission bodies compared to a structure in which light enters from a side surface of a light guide body.

(6) The upper light emission unit 17a and the lower light emission unit 17b each include a light guide body. Thus, each of the upper light emission unit 17a and the lower light emission unit 17b includes a light emission surface that emits light over a wide range with fewer light emission bodies. Further, the design can be improved with the upper light emission unit 17a and the lower light emission unit 17b. The upper light emission unit 17a, the lower light emission unit 17b, and the side light emission unit 17c extend along the periphery of the light compartment 14 and allow the vehicle light to have a relatively superior design.

(7) The second light guide body 23 of the lower light emission unit 17b is integrated with the third light guide body 25 of the side light emission unit 17c. This increases the amount of light entering the second light guide body 23. As a result, the intensity of the light emitted from the lower light emission unit 17b is higher than the upper light emission unit 17a and the design can thereby be further improved.

The present embodiment may be modified as follows. The present embodiment and the following modifications can be combined as long as the combined modifications remain technically consistent with each other.

The combination of the optical system using a reflector and the optical system using a light guide body in the embodiment may be used for a use other than the daytime running lamp and the clearance lamp.

The combination of the optical system using a reflector and the optical system using a light guide body in the embodiment may be employed to a taillight serving as a vehicle light in addition to or instead of a headlight.

The upper light emission unit 17a, the lower light emission unit 17b, and the side light emission unit 17c may have any design (shape). For example, the upper light emission unit 17a, the lower light emission unit 17b, and the side light emission unit 17c does not have to be linear, and may be curved, corrugated, or a zigzagged. Further, the upper light emission unit 17a may have the same design as the lower light emission unit 17b.

The first to third light guide bodies 21, 23, and 25 may have any form. For example, the first to third light guide bodies 21, 23, and 25 may be rod-shaped so as to have a circular cross-section or rod-shaped so as to have an oval cross-section.

The second light emission device 16 may include only one of the upper light emission unit 17a and the lower light emission unit 17b. That is, the second light emission device 16 does not have to include the upper light emission unit 17a or the lower light emission unit 17b. Further, the second light emission device 16 may include only the side light emission unit 17c and not include the upper light emission unit 17a and the lower light emission unit 17b.

The light emission portion of the third light guide body 25 may partially overlap the reflection surface 26 of the reflector 27. In other words, the third light guide body 25 may be partially arranged in the path of light reflected by the reflector 27.

The second light guide body 23 of the lower light emission unit 17b may be formed separately from the third light guide body 25 of the side light emission unit 17c. Further, the third light guide body 25 of the side light emission unit 17c may be integrated with the first light guide body 21 of the upper light emission unit 17a instead of the second light guide body 23 of the lower light emission unit 17b.

Light may enter the upper light emission unit 17a from only one end. In the same manner, light may enter the lower light emission unit 17b from only one end.

The light emission body that forms the first to sixth light sources may be a LED chip or a light bulb.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A vehicle light, comprising:
    a light compartment;
    a first light emission unit that is arranged in the light compartment and includes a first light emission body and a light guide body configured to emit light by internally reflecting light from the first light emission body; and
    a second light emission unit that is arranged in the light compartment and includes a second light emission body and a reflector configured to reflect light from the second light emission body in a vehicle forward direction,
    wherein the light guide body is arranged outward with respect to a vehicle widthwise direction in the light compartment, and a light emission portion of the light guide body at least partially overlaps a path of light reflected by the reflector.

2. The vehicle light according to claim 1, wherein
    the first light emission unit is one of a plurality of first light emission units,
    the plurality of first light emission units include
        a side light emission unit configured to emit light outward in the vehicle widthwise direction and linearly in a vehicle height direction,
        an upper light emission unit configured to emit light in the vehicle forward direction and linearly in the vehicle widthwise direction and located upward from the side light emission unit in the vehicle height direction, and
        a lower light emission unit configured to emit light in the vehicle forward direction and linearly in the vehicle widthwise direction and located downward from the side light emission unit in the vehicle height direction, and
    the light emission portion of the light guide body of the side light emission unit at least partially overlaps the path of light reflected by the reflector.

3. The vehicle light according to claim 2 wherein, the light guide body of the side light emission unit is integrated with the light guide body of the lower light emission unit so that light from the light emission body of the side light emission unit also enters the light guide body of the lower light emission unit through the light guide body of the side light emission unit.

* * * * *